US006230240B1

(12) United States Patent
Shrader et al.

(10) Patent No.: US 6,230,240 B1
(45) Date of Patent: May 8, 2001

(54) STORAGE MANAGEMENT SYSTEM AND AUTO-RAID TRANSACTION MANAGER FOR COHERENT MEMORY MAP ACROSS HOT PLUG INTERFACE

(75) Inventors: Steven L. Shrader; Robert A. Rust, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/103,329

(22) Filed: Jun. 23, 1998

(51) Int. Cl.[7] .................................................. G06F 13/00
(52) U.S. Cl. .............................. 711/114; 711/162; 714/6; 710/103; 710/129; 710/54
(58) Field of Search ...................................... 711/114, 113, 711/112, 161, 162; 714/5, 6, 7; 710/129, 103, 245, 39, 54

(56) References Cited

U.S. PATENT DOCUMENTS

| | | | |
|---|---|---|---|
| 5,432,922 | * 7/1995 | Polyzois et al. | 714/6 |
| 5,479,653 | * 12/1995 | Jones | 714/5 |
| 5,548,712 | * 8/1996 | Larson et al. | 714/7 |
| 5,651,133 | * 7/1997 | Burkes et al. | 711/114 |
| 5,666,512 | * 9/1997 | Nelson et al. | 711/114 |
| 5,699,510 | * 12/1997 | Petersen et al. | 714/6 |
| 5,802,394 | * 9/1998 | Baird et al. | 711/114 |
| 5,928,367 | * 7/1999 | Nelson et al. | 714/6 |
| 5,960,451 | * 9/1999 | Voigt et al. | 711/114 |

OTHER PUBLICATIONS

Wilkes et al, "The HP AutoRAID Hierarchical Storage System," ACM Trans. on Comp. Sys., vol. 14, No. 1, Feb. 1996, pp 108–136.*

* cited by examiner

Primary Examiner—Glenn Gossage

(57) ABSTRACT

A storage management system for a Redundant Array of Independent Disks (RAID) data storage system and an AutoRAID memory transaction manager for a disk array controller are disclosed. The disk array controller enables a consistent, coherent memory image of the data storage space to all processors across hot-plug interfaces. To external processes seeking to read or write data, the memory image looks the same across the hot-plug interface. The disk array controller has two identical controllers, each with its own non-volatile memory, to maintain redundant images of disk array storage space. A hot-plug interface interconnects the two controllers. Each controller has an AutoRAID memory transaction manager that enables sharing of cyclic redundancy check (CRC)-protected memory transactions over the hot-plug interface between the two controllers. The Auto-RAID memory transaction managers also have transaction queues which facilitate ordered execution of the memory transactions regardless of which controller originated the transactions. The AutoRAID transaction manager includes first and second bus interfaces, a mirror entity, and a local memory interface. Mirrored read and write transactions are handled atomically across the hot-plug interface.

11 Claims, 3 Drawing Sheets

STORAGE MANAGEMENT SYSTEM AND AUTO-RAID TRANSACTION MANAGER FOR COHERENT MEMORY MAP ACROSS HOT PLUG INTERFACE

FIELD OF THE INVENTION

This invention relates to data storage systems, such as hierarchical RAID (Redundant Array of Independent Disks) data storage systems. More particularly, this invention relates to disk array controllers for data storage systems that provide a coherent, consistent memory image to multiple processors across a hot-plug interface.

BACKGROUND OF THE INVENTION

Conventional disk array data storage systems have multiple storage disk drive devices that are arranged and coordinated to form a single mass storage system. The common design goals for mass storage systems include low cost per megabyte, high input/output performance, and high data availability. Data availability involves the ability to access data stored in the storage system while ensuring continued operation in the event of a disk or component failure. Data availability is often provided through the use of redundancy where data, or relationships among data, are stored in multiple locations on the storage system. In the event of failure, redundant data is retrieved from the operable portion of the system and used to regenerate the original data that is lost due to the component failure.

There are two common methods for storing redundant data on disk drives: mirror and parity. In mirror redundancy, data is duplicated and stored in two separate areas of the storage system. In parity redundancy, redundant data is stored in one area of the storage system, but the size of the redundant storage area is less than the remaining storage area used to store the original data.

RAID (Redundant Array of Independent Disks) storage systems are disk array systems in which part of the physical storage capacity is used to store redundant data. RAID systems are typically characterized as one of six architectures, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirror redundancy. Original data is stored on one set of disks and a duplicate copy of the data is kept on separate disks. The RAID 2 through RAID 5 architectures all involve parity-type redundant storage. Of particular interest, a RAID 5 system distributes data and parity information across all of the disks. Typically, the disks are divided into equally sized address areas referred to as "blocks". A set of blocks from each disk that have the same unit address ranges are referred to as "stripes". In RAID 5, each stripe has N blocks of data and one parity block which contains redundant information for the data in the N blocks.

In RAID 5, the parity block is cycled across different disks from stripe-to-stripe. For example, in a RAID 5 system having five disks, the parity block for the first stripe might be on the fifth disk; the parity block for the second stripe might be on the fourth disk; the parity block for the third stripe might be on the third disk; and so on. The parity block for succeeding stripes typically "precesses" around the disk drives in a helical pattern (although other patterns are possible). RAID 2 through RAID 4 architectures differ from RAID 5 in how they compute and place the parity block on the disks.

A hierarchical data storage system permits data to be stored according to different techniques. In a hierarchical RAID system, data can be stored according to multiple RAID architectures, such as RAID 1 and RAID 5, to afford tradeoffs between the advantages and disadvantages of the redundancy techniques.

U.S. Pat. No. 5,392,244 to Jacobson et al., entitled "Memory Systems with Data Storage Redundancy Management", describes a hierarchical RAID system that enables data to be migrated from one RAID type to another RAID type as data storage conditions and space demands change. This patent, which is assigned to Hewlett-Packard Company, describes a multi-level RAID architecture in which physical storage space is mapped into a RAID-level virtual storage space having mirror and parity RAID areas (e.g., RAID 1 and RAID 5). The RAID-level virtual storage space is then mapped into an application-level virtual storage space, which presents the storage space to the user as one large contiguously addressable space. During operation, as user storage demands change at the application-level virtual space, data can be migrated between the mirror and parity RAID areas at the RAID-level virtual space to accommodate the changes. For instance, data once stored according to mirror redundancy may be shifted and stored using parity redundancy, or vice versa. The '244 patent is hereby incorporated by reference to provide additional background information.

With data migration, the administrator is afforded tremendous flexibility in defining operating conditions and establishing logical storage units (or LUNs). As one example, the RAID system can initially store user data according to the optimum performing RAID 1 configuration. As the user data approaches and exceeds 50% of array capacity, the disk array system can then begin storing data according to both RAID 1 and RAID 5, and dynamically migrating data between RAID 1 and RAID 5 in a continuous manner as storage demands change. At any one time during operation, the data might be stored as RAID 1 or RAID 5 on all of the disks. The mix of RAID 1 and RAID 5 storage changes dynamically with the data I/O (input/output). This allows the system to optimize performance versus an increasing amount of user data.

SUMMARY OF THE INVENTION

This invention provides a mirrored memory disk array controller that enables a consistent, coherent memory image of the data storage space to all processors across hot-plug interfaces. To host processes seeking to read or write data, the memory image looks the same across the hot-plug interfaces.

In the described implementation, the disk array controller has two identical controllers, each with its own non-volatile memory, to maintain redundant images. A hot-plug interface interconnects the two controllers. Each controller has an AutoRAID memory transaction manager that enables sharing of cyclic redundancy check (CRC)-protected memory transactions over the hot-plug interface between the two controllers. The AutoRAID memory transaction managers also facilitate ordered execution of the memory transactions regardless of which controller originated the transactions. Mirrored read and write transactions are handled atomically across the hot-plug interface.

BRIEF DESCRIPTION OF THE DRAWINGS

The same reference numbers are used throughout the figures to reference like components and features.

DETAILED DESCRIPTION OF THE INVENTION

Figure 1:
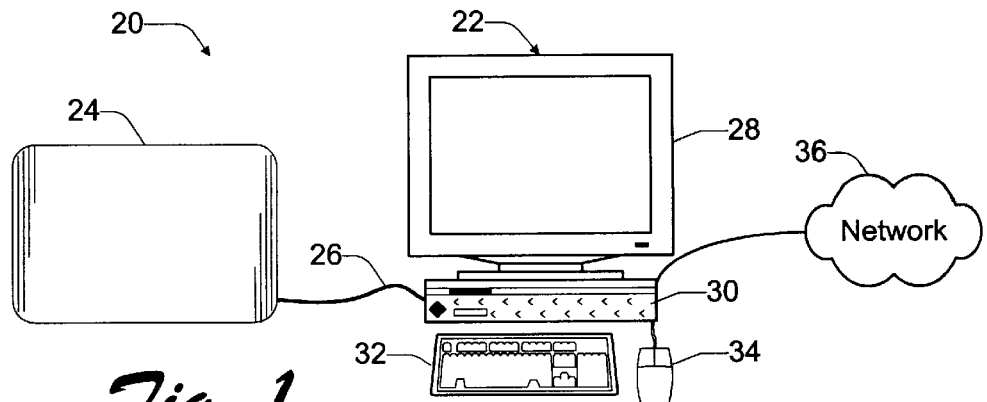
FIG. 1 is a diagrammatic illustration of a host computer connected to a data storage system.

FIG. 1 shows a computer system 20 having a host computer 22 connected to a data storage system 24 via an input/output (I/O) interface bus 26. Host computer 22 is a general purpose computer that can be configured, for example, as a server or workstation. Computer 22 has a visual display monitor 28, a central processing unit (CPU) 30, a keyboard 32, and a mouse 34. Other data entry and output peripherals may also be included, such as a printer, tape, compact disc read only memory (CD-ROM), network interfaces, and so forth. In FIG. 1, the host computer 22 is coupled to a network 36 to serve data from the data storage system 24 to one or more clients (not shown).

The data storage system 24 holds user data and other information. In the preferred implementation, the data storage system 24 is a hierarchical Redundant Array of Independent Disks (RAID) system that is capable of storing data according to different redundancy schemes. The host computer 22 provides an interface for an administrator to configure the memory space in the RAID system 24, run diagnostics, evaluate performance, and otherwise manage the RAID storage system.

Figure 2:
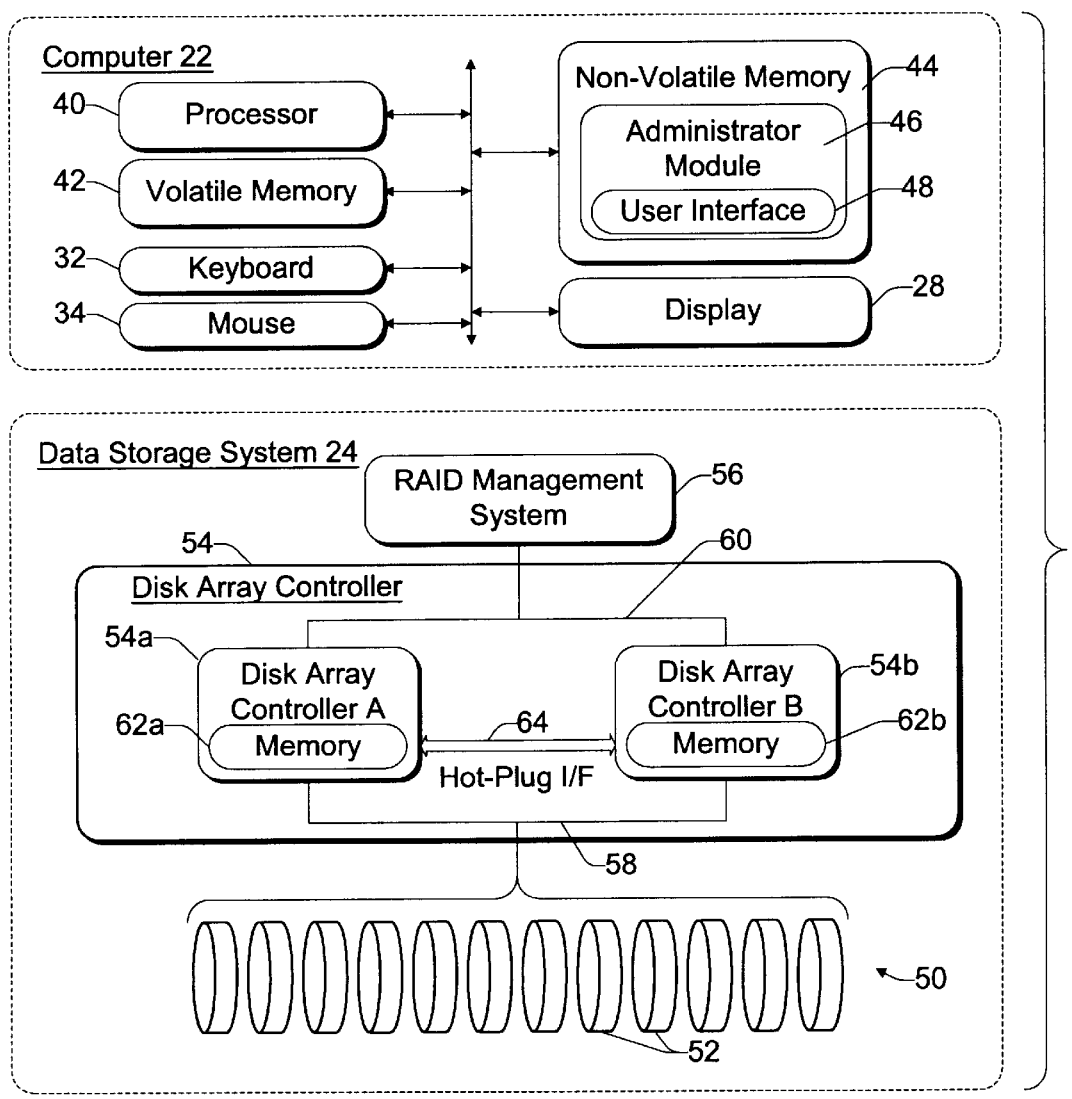
FIG. 2 is a block diagram of the host computer and data storage system. The data storage system is illustrated as a hierarchical RAID system.

FIG. 2 shows the host computer 22 and data storage system 24 in more detail. The computer 22 has a processor 40, a volatile memory 42 i.e., random access memory (RAM)), a keyboard 32, a mouse 34, a non-volatile memory 44 (e.g., ROM, hard disk, floppy disk, CD-ROM, etc.), and a display 28. An administrator module 46 is stored in memory 44 and executes on processor 40. The administrator module 46 provides management functions such as diagnostics, performance review, local unit number (LUN) arrangement analysis, and capacity analysis. The administrator module 48 supports a storage manager graphical user interface (UI) 48 that presents a visual interface on the display 28.

The data storage system 24 has a disk array 50 with multiple storage disks 52, a disk array controller 54, and a RAID management system 56. The disk array controller 54 is coupled to the disk array 50 via one or more interface buses 58, such as a small computer system interface (SCSI) bus. The RAID management system 56 is coupled to the disk array controller 54 via an interface protocol 60. It is noted that the RAID management system 56 can be embodied as a separate component (as shown), or within the disk array controller 54, or within the host computer 22. The RAID management system 56 is preferably a software module that runs on a processing unit of the data storage system 24, or on the processor 40 of the computer 22.

The disk array controller 54 coordinates data transfer to and from the disk array 50. The disk array controller 54 has two identical controllers or controller boards: a first disk array controller 54a and a second disk array controller 54b. The parallel controllers enhance reliability by providing continuous backup and redundancy in the event that one controller becomes inoperable. The parallel controllers 54a and 54b have respective mirrored memories 62a and 62b. The mirrored memories 62a and 62b are preferably implemented as battery-backed, non-volatile RAMs (NVRAMs). Although only dual controllers 54a and 54b are shown and discussed generally herein, aspects of this invention can be extended to other multi-controller configurations where more than two controllers are employed.

The mirrored memories 62a and 62b store several types of information. The mirrored memories 62a and 62b maintain duplicate copies of a cohesive memory map of the storage space in disk array 50. This memory map tracks where data and redundancy information are stored on the disk 52, and where available free space is located. The view of the mirrored memories is consistent across the hot-plug interface, appearing the same to external processes seeking to read or write data.

The mirrored memories 62a and 62b also maintain a read cache that holds data being read from the disk array 50. Every read request is shared between the controllers. The mirrored memories 62a and 62b further maintain two duplicate copies of a write cache. Each write cache temporarily stores data before it is written out to the disk array 50.

One particular implementation of a mirrored memory dual controller for a disk storage system is described in U.S. Pat. No. 5,699,510, entitled "Failure Detection System for a Mirrored Memory Dual Controller Disk Storage System," which issued Dec. 16, 1997 in the names of Petersen et al. and is assigned to Hewlett-Packard Company. This patent is incorporated by reference for background information pertaining generally to dual controller disk storage systems.

The controller's mirrored memories 62a and 62b are physically coupled via a hot-plug interface 64. In the absence of this invention, the hot-plug interface 64 introduces a possible problem in that single points of failure could corrupt both memories 62a and 62b. An aspect of this invention is to prevent such corruption, and to ensure that the two memories maintain correctly replicated images of the storage space. Generally, the controllers 62a and 62b monitor data transfers between them to ensure that data is accurately transferred and that transaction ordering is preserved (e.g., read/write ordering).

Figure 3:
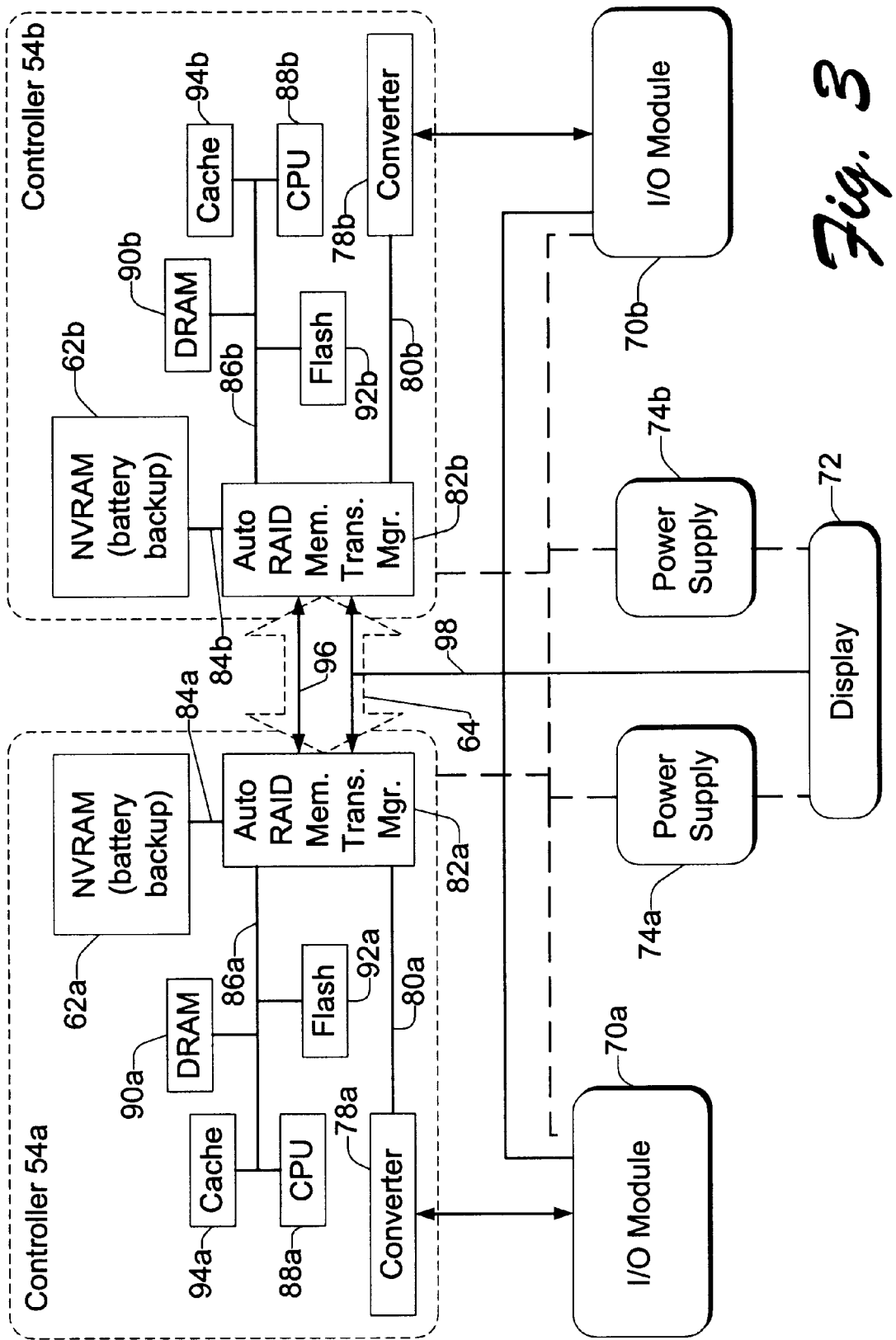
FIG. 3 is a block diagram of the mirrored memory disk array controller in the data storage system, embodied with two controllers.

FIG. 3 shows the dual disk array controller in more detail. In addition to the controller boards 54a and 54b, the disk array controller also has two I/O modules 70a and 70b, a display 72, and two power supplies 74a and 74b. The I/O modules 70a and 70b facilitate data transfer between respective controllers 54a and 54b and the host computer 22. In one implementation, the I/O modules 70a and 70b employ fiber channel technology, although other bus technologies may be used. The power supplies 74a and 74b provide power to the other components in the disk array controller 54 (FIG. 2), including the controllers 54a, 54b, the display 72, and the I/O modules 70a, 70b.

Each controller 54a, 54b has a converter 78a, 78b connected to receive signals from the host via respective I/O modules 70a, 70b. Each converter 78a and 78b converts the signals from one bus format (e.g., fiber channel) to another bus format (e.g., peripheral component interconnect (PCI)). A first PCI bus 80a, 80b carries the signals to an AutoRAID memory transaction manager 82a, 82b, which handles all mirrored memory transaction traffic to and from the NVRAM 62a, 62b in the mirrored controller. The AutoRAID memory transaction manager maintains the memory map, computes parity, and facilitates cross-communication with the other controller. The AutoRAID memory transaction manager 82a, 82b is preferably implemented as an integrated circuit (IC), such as an application-specific integrated circuit (ASIC).

The AutoRAID memory transaction manager 82a, 82b is coupled to the NVRAM 62a, 62b via a high-speed bus 84a, 84b and to other processing and memory components via a second PCI bus 86a, 86b. Each controller 54a, 54b has at least one CPU 88a, 88b and several types of memory connected to the PCI bus 86a and 86b. The memory includes a dynamic RAM (DRAM) 90a, 90b, Flash memory 92a, 92b, and cache 94a, 94b.

The AutoRAID memory transaction managers 82a and 82b are coupled to one another via a hot-plug interface 64. The hot-plug interface 64 supports bi-directional parallel communication between the two AutoRAID memory transaction managers 82a and 82b at a data transfer rate commensurate with the NVRAM buses 84a and 84b.

The hot-plug interface 64 is implemented using a point-to-point bus 96 and I²C buses 98. The point-to-point bus 96 is a multi-bit bus that transports memory transaction data between the mirrored memory controllers 54a and 54b. The I²C buses 98 carry microprocessor communications, peripheral communications, and so forth.

The AutoRAID memory transaction managers 82a and 82b employ a high-level packet protocol to exchange transactions in packets over the bus 96 of the hot-plug interface 64. The AutoRAID memory transaction managers 82a and 82b perform error correction on the packets to ensure that the data is correctly transferred between the controllers.

The AutoRAID memory transaction managers 82a and 82b provide a memory image that is coherent across the hot plug interface 64. The managers 82a and 82b also provide an ordering mechanism to support an ordered interface that ensures proper sequencing of memory transactions.

Figure 4:
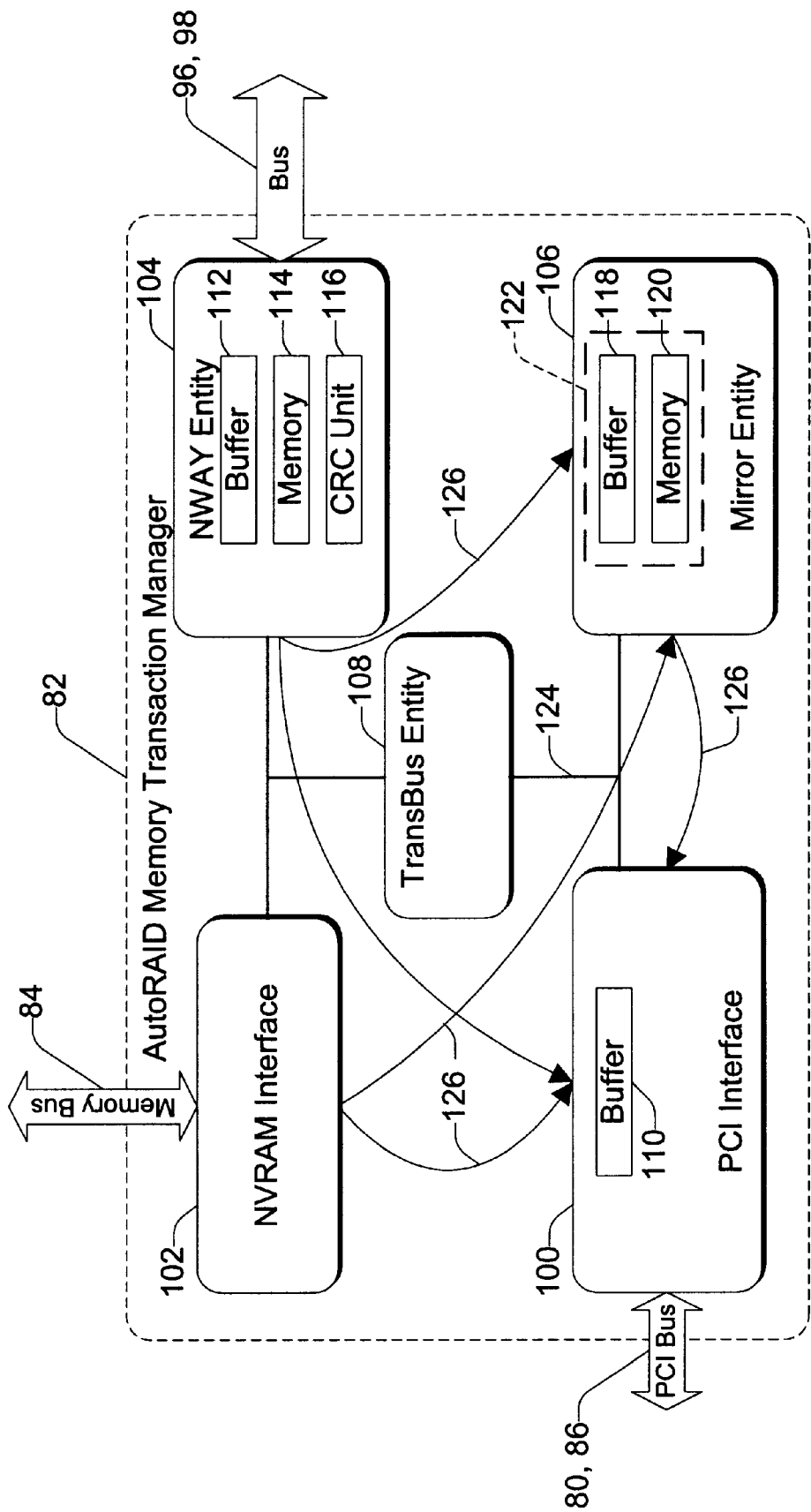
FIG. 4 is a block diagram of an AutoRAID memory transaction manager implemented in each controller of the disk array controller.

FIG. 4 shows the AutoRAID memory transaction manager in more detail. For discussion purposes, the AutoRAID memory transaction manager is generally referenced as number 82, without the "a" and "b" designations. The AutoRAID memory transaction manager in FIG. 4 is representative of either component 82a or 82b, as both are identically constructed.

The AutoRAID memory transaction manager 82 has a PCI interface 100, an NVRAM interface 102, an NWay interface or entity 104, a mirror entity 106, and a transbus entity 108. The PCI interface 100 facilitates data transfer over the PCI bus 80 to and from the I/O module 70a, 70b via the converter 78a, 78b and over PCI bus 86 to and from the CPU 88a, 88b. The PCI interface 100 has a buffer 110 to temporarily hold transaction data being transferred to and from other entities in the memory transaction manager 82.

The NVRAM interface 102 handles read and write transaction requests and facilitates data transfer to and from the local NVRAM 62.

The NWay interface or entity 104 facilitates transfer of remote memory transactions over the hot-plug interface between the controllers. As noted above, the transactions are transferred in packets, which are error corrected to ensure that the transfers are valid. The NWay interface 104 has one or more buffers 112 to hold transaction data, a data memory 114 to hold packets being exchanged across the hot-plug interface with the other controller, and a CRC unit 116 to perform error correction on individual or groups of packets.

The mirror entity 106 handles local and mirrored memory transactions and orders them via the transbus entity 108. The mirror entity accommodates such transactions as mirrored reads, mirrored writes, and local reads in a mirrored space. The mirror entity 106 has a buffer 118 and a data memory 120. A transaction queue 122 is formed in both or ones of the buffer 118 and data memory 120.

The transbus entity 108 enables the different components 100–106 to issue commands. The transbus entity 108, along with the transaction queue 122 in the mirror entity 106, provide the ordering functionality that orders transactions received at the controller.

The transbus entity 108 controls a multiple access bus 124 that interconnects the four components 100–106. The PCI interface 100, the NWay interface 104 and the mirror entity 106 initiate transactions on the transbus entity 108 and all four components 100–106 receive transactions from the transbus entity 108. The transbus entity 108 identifies the source of the request (i.e., a source identifier (ID), an address of the access, and other attributes.

Data is moved between the four components 100–106 via callback buses 126. There is one callback bus 126 for each component that acts as an originator of a transaction. The PCI interface 100, the NWay interface 104, and the mirror entity 106 have a callback bus 126.

Several transactions are described below to exemplify operation of the disk array controller. These transactions will be described in the following order: mirrored read, local read, mirrored write, and concurrent writes. The transactions are described in the context of the dual controllers with reference to FIGS. 3 and 4. However, the transactions may be performed in other multi-controller implementations involving more than two controllers.

Mirrored Read

In a mirrored read request, the controllers 54a and 54b use the memory map in the mirrored memories 62 and 62b to locate the requested data on the disk array. The data is then stored temporarily in the read cache maintained in the mirrored memories 62a and 62b. Suppose that controller 54a receives a request from the host via I/O module 70a to read data from the disk array. The controller CPU 88a processes the request and generates a mirrored read request that involves reading data from the mirrored memories 62a and 62b. The mirrored read request is sent to the PCI interface 100 of the AutoRAID memory transaction manager 82a.

In this example, the first controller 54a and its AutoRAID memory transaction manager 82a are referred to as the "local" controller and manager because they receive and originate the mirrored read request. The second controller 54b and its AutoRAID memory transaction manager 82b are referred to as the "remote" controller and manager. In this mirrored read transaction, the local and remote managers perform the following steps:

Step 1: The PCI interface 100 makes a request to the transbus entity 108 via the bus 124 for a particular piece of data. The request includes a memory address, the number of bytes, and an indication that it is a read operation, and so forth.

Step 2: The mirror entity 106 accepts the request from the transbus entity 108 as its own and places the request in the transaction queue 122. The queue 122 maintains order over various requests that are being handled by the local manager 82a.

Step 3: When the request moves to the top of the queue 122, the mirror entity 106 makes a request to the transbus entity 108 for the NWay entity 104 to obtain the mirrored copy of data from the remote memory transaction manager 82b. The request from the mirror entity 106 includes the same information (i.e., memory address, byte number, etc.) as found in the original request made in Step 1 by the PCI interface.

Step 4: The NWay entity 104 packages the read request in a packet and computes a CRC value for the packet using the CRC unit 116. The NWay entity 104 transfers the read request packet over the bus 96 to the corresponding NWay entity in the remote AutoRAID memory transaction manager 82b.

Step 5: The remote NWay entity checks the CRC value to ensure valid transfer and makes a request via the remote transbus entity to the remote NVRAM interface to read the particular piece of data. The remote NWay entity returns an acknowledgment to the local NWay entity 104 indicating that the request was properly received and has been posted for execution.

Step 6: Concurrently with step 5, the local NWay entity 104 makes a request to the local NVRAM interface 102 via the transbus entity 108 to read the particular piece of data.

Step 7: The local and remote NVRAM interfaces concurrently retrieve the same piece of data from their respective NVRAMs 62a and 62b. The local NVRAM interface 102 places the data on the callback bus 126. The remote NVRAM interface places the data on a callback bus that is being monitored by the remote mirror entity, which then makes a request to the remote NWay entity to transfer the data to the local manager 82a. The remote NWay entity packages the data, error corrects the packet and transfers the packet across the bus 96 to the local NWay entity 104.

Step 8: The local NWay entity 104 checks the CRC value to ensure valid transfer and posts the data on its callback bus 126.

Step 9: In the mean time, the local mirror entity 106 that originated the read request watches the callback buses 126 from the NVRAM interface 102 and the NWay entity 104. When the local data is received from the NVRAM interface 102 and the remote copy is received from the NWay entity 104, the mirror entity 106 compares the two versions to make sure they match. A match indicates that the data is valid.

Step 10: Assuming the data is valid, the mirror entity 106 returns the data via the callback bus 126 back to the PCI interface 100. The PCI interface 100 is monitoring the callback buses because it does not know from where the data is coming (e.g., whether from the mirror entity or the NVRAM interface). The PCI interface 100 then transfers the results back to the CPU or to the converter for return to the host.

Local Read

Suppose that controller 54a receives a read request that does not require a read compare operation. The local controller 54a can read the data from its own memory without requesting the copy from the remote controller. In the local read transaction, the local AutoRAID memory transaction manager performs the following steps:

Step 1: The PCI interface 100 makes a request to the transbus entity 108 via the bus 124 for a piece of data on the local NVRAM 62a. The request includes a memory address, the number of bytes, and an indication that it is a read operation, and so forth.

Step 2: The mirror entity 106 accepts the request from the transbus entity 108 as its own and places the request in the transaction queue 122. In this manner, the local reads are handled in order with other types of transactions, including the mirrored read transactions described above.

Step 3: When the request moves to the top of the queue 122, the mirror entity 106 makes the local read request to the transbus entity 108. The NVRAM interface 102 accepts the request and retrieves the data from the NVRAM 62a. The NVRAM interface 102 places the data on its callback bus 126.

Step 4: The PCI interface 100 is watching the callback bus 126 for the returned data. The PCI interface 100 then transfers the results back to the CPU or to the converter for return to the host.

Mirrored Write

The controllers 54a and 54b handle a mirrored write request by (1) storing the data in the respective write caches maintained in the mirrored memories and (2) updating the memory map in the mirrored memories. Suppose that controller 54a receives a write request to write data to a particular location on the disk array. The write request is received at the PCI interface 100 from the PCI bus. The local and remote AutoRAID memory transaction managers then perform the following steps:

Step 1: The PCI interface 100 makes a write request to the transbus entity 108 via the bus 124. The request includes a memory address, a pointer to the data to be written, an indication that it is a mirrored write operation, and so forth.

Step 2: The mirror entity 106 accepts the write request from the transbus entity 108 and places the request in the transaction queue 122. Once again, the transaction queue 122 maintains order among the various memory transactions.

Step 3: When the request moves to the top of the queue 122, the mirror entity 106 places the write request back on the transbus entity 108 for acceptance by the NWay entity 104. At this point, the mirror entity 106 is finished with the process.

Step 4: The NWay entity 104 packages the write request in a packet and computes a CRC value for the packet using the CRC unit 116. The NWay entity 104 transfers the write request packet over the bus 96 to the corresponding NWay entity in the remote AutoRAID memory transaction manager 82b.

Step 5: The remote NWay entity checks the CRC value to ensure valid transfer and makes a request via the remote transbus entity to the remote NVRAM interface to read the particular piece of data. The remote NWay entity returns an acknowledgment to the local NWay entity 104 indicating that the request was properly received and has been posted for execution.

Step 6: Concurrently with step 5, the local NWay entity 104 makes a request to the local NVRAM interface 102 via the transbus entity 108 to write the data to the write cache in the mirrored memory 62a.

Step 7: The local and remote NVRAM interfaces write the same data to the write caches in their respective NVRAMs 62a and 62b. The local NVRAM interface 102 puts an acknowledgment on the callback bus 126 when the write is completed.

Step 8: The local PCI interface 100 monitors the callback bus for the acknowledgment, and returns an acknowledgment of the mirrored write completion upon receipt of the acknowledgment from the NVRAM interface 102.

Concurrent Writes The last exemplary transactions involve a situation in which the CPU 88a on the local controller 54a requests a write to a specific memory location and the CPU 88*b* on the remote controller 54*b* requests a write to the same memory location. In this situation, the mirrored memory disk array controller is designed to ensure that write requests are ordered and fully completed. To do this, the dual controllers 54*a* and 54*b* assume roles of master/slave or primary/secondary, whereby one controller is crowned with the tasks of ordering transactions and the other controller agrees to abide by this ordering. Determining which controller is the master or primary can be handled ahead of time, as part of a reconfiguration process, or can be negotiated by the controllers when such situations arise.

For purposes of illustration, suppose that local controller 54*a* is the master or primary controller and remote controller 54*b* is the slave or secondary controller. The write requests are received at the respective PCI interfaces of the master and slave AutoRAID memory transaction managers 82*a* and 82*b* from the PCI bus. The master and slave AutoRAID memory transaction managers 82*a* and 82*b* then perform the following steps:

Step 1: At each manager, the PCI interfaces make a write request to the transbus entities. The request includes a memory address, a pointer to the data to be written, an indication that it is a mirrored write operation, and so forth.

Step 2: The mirror entities accept the write requests from the transbus entities and place the requests in their transaction queues.

Step 3: When the requests move to the tops of the queues, the mirror entities place the write requests back on the transbus entities for acceptance by he NWay entities.

Step 4: The NWay entities transfer the write requests as CRC-protected packets over the bus 96 to the opposing NWay entities. Acknowledgments of receipt are also exchanged.

Step 5: Concurrently with step 4, the local and remote NWay entities also make requests to their respective NVRAM interfaces via the transbus entities to write the data to the write caches in the mirrored memories 62*a* and 62*b*. As a result of steps 4 and 5, the two write transactions will be posted to the transbus entities within the AutoRAID memory transaction managers. The order of these write transactions is controlled by their order on the transbus entities of the "master" controller, which in this case is controller 54*a*. Accordingly, if the write request received locally at the master controller 54*a* is posted first to the local transbus entity 108 before the write request from the remote (or slave) controller 54*b* is posted, the locally received write request is processed first. Conversely, if the write request received locally at the master controller 54*a* is posted to the local transbus entity 108 after the write request from the remote (or slave) controller 54*b* is posted, the remotely received write request is processed first. The slave AutoRAID memory transaction manager abides by this ordering.

Step 6: The local and remote NVRAM interfaces write the data in the winning write request to the write caches in their respective NVRAMs 62*a* and 62*b*. The NVRAM interfaces place respective acknowledgments on their callback buses when the write is completed.

Step 7: The PCI interfaces monitor the callback buses for the acknowledgment, and return an acknowledgment of the mirrored write completion upon receipt.

Atomicity

The mirrored read and write transactions described above are handled atomically across the hot-plug interface. The controllers are designed to either perform the read and write operations for both NVRAMs, or to abort performance for both NVRAMs. In this manner, the images presented in the NVRAMs remain identical.

SUMMARY

The mirrored memory disk array controller is advantageous because it maintains a coherent memory map across a hot-plug interface. The dual controllers, and particularly the AutoRAID memory transaction managers, facilitate ordered execution of the transactions.

Although the invention has been described in language specific to structural features and/or method steps, it is to be understood that the invention defined in the appended claims is not necessarily limited to the specific features or steps described. Rather, the specific features and steps are disclosed as preferred forms of implementing the claimed invention.

What is claimed is:

1. A storage management system for a redundant array of independent disks (RAID) data storage system, comprising:
   at least two controllers interconnected via a hot-plug interface, each controller having a non-volatile memory to store redundant images of storage space provided by the data storage system;
   each controller further having a memory transaction manager that orders memory transactions involving its non-volatile memory and facilitates transmission and receipt of the memory transactions over the hot-plug interface, wherein each memory transaction manager comprises:
   a transbus entity to control a multiple access bus;
   a first bus interface to receive memory transactions from a bus and to post the memory transactions on the access bus;
   a mirror entity coupled to the access bus to handle the memory transactions received by the first bus interface, the mirror entity ordering the memory transactions;
   a local memory interface coupled to the access bus to receive the memory transactions from the mirror entity and to execute the memory transactions with respect to a local non-volatile memory; and
   a second bus interface coupled to the access bus to facilitate transfer of the memory transactions to a remote mirrored memory in a different one of the controllers.

2. A storage management system as recited in claim 1, wherein the redundant images stored by the non-volatile memories of the controllers appear identically across the hot-plug interface to external processes seeking to read or write data.

3. A storage management system as recited in claim 1, wherein each memory transaction manager exchanges the memory transactions in cyclic redundancy check (CRC)-protected packets to guarantee valid transfer.

4. A storage management system as recited in claim 1, wherein each memory transaction manager comprises a transaction queue to order the memory transactions.

5. A storage management system as recited in claim 1, wherein the memory transaction managers perform the memory transactions for respective ones of the non-volatile memories in an atomic manner.

6. A storage management system as recited in claim 1, wherein the controllers designate one of the memory transaction managers as having primary responsibility of ordering the memory transactions for all of the controllers.

7. An AutoRAID memory transaction manager for a disk array controller having a non-volatile memory to store redundant images of storage space provided by a data storage system, the disk array controller interconnected to a second disk array controller via a hot-plug interface, the memory transaction manager facilitating transmission and receipt of memory transactions involving the non-volatile memory over the hot-plug interface and, the memory transaction manager comprising:

a transbus entity to control a multiple access bus;

a first bus interface to receive the memory transactions from a bus and to post the memory transactions on the access bus;

a mirror entity coupled to the access bus to handle the memory transactions received by the first bus interface, the mirror entity ordering the memory transactions;

a local memory interface coupled to the access bus to receive the memory transactions from the mirror entity and to execute the memory transactions with respect to the non-volatile memory; and a second bus interface coupled to the access bus to facilitate transfer of the memory transactions to a remote mirrored memory in the second disk array controller.

8. An AutoRAID memory transaction manager as recited in claim 7, wherein the mirror entity comprises a transaction queue to hold the memory transactions in an order.

9. An AutoRAID memory transaction manager as recited in claim 7, wherein the second bus interface packages the memory transactions as one or more packets and computes an error correction value for the one or more packets.

10. An AutoRAID memory transaction manager as recited in claim 7, wherein the AutoRAID memory transaction manager is formed on an integrated circuit chip.

11. A disk array controller for an AutoRAID data storage system, comprising:

multiple controllers having respective memories that store redundant memory maps, each controller being equipped with an AutoRAID memory transaction manager to manage memory transactions involving a first controller having a local non-volatile memory with respect to a second controller having a remote mirrored memory, each AutoRAID memory transaction manager comprising:

a transbus entity to control a multiple access bus;

a first bus interface to receive memory transactions from a bus and to post the memory transactions on the access bus;

a mirror entity coupled to the access bus to handle the memory transactions received by the first bus interface, the mirror entity ordering the memory transactions;

a local memory interface coupled to the access bus to receive the memory transactions from the mirror entity and to execute the memory transactions with respect to the local non-volatile memory in the first controller; and a second bus interface coupled to the access bus to facilitate transfer of the memory transactions to the remote mirrored memory in the second controller.

* * * * *